(12) United States Patent
Goose et al.

(10) Patent No.: US 8,549,142 B2
(45) Date of Patent: Oct. 1, 2013

(54) REPLICATED STATE MACHINE UTILIZING VIEW CHANGE PROTOCOL RESILIENT TO PERFORMANCE ATTACKS

(75) Inventors: Stuart Goose, Berkeley, CA (US); Jonathan Kirsch, Menlo Park, CA (US)

(73) Assignee: Siemens Corporation, Iselin, NJ (US)

( * ) Notice: Subject to any disclaimer, the term of this patent is extended or adjusted under 35 U.S.C. 154(b) by 88 days.

(21) Appl. No.: 13/422,258

(22) Filed: Mar. 16, 2012

(65) Prior Publication Data

US 2012/0254412 A1 Oct. 4, 2012

Related U.S. Application Data

(60) Provisional application No. 61/468,124, filed on Mar. 28, 2011.

(51) Int. Cl.
*G06F 15/16* (2006.01)
*G06F 12/00* (2006.01)

(52) U.S. Cl.
USPC ........................................... 709/224; 709/250

(58) Field of Classification Search
USPC ........................... 709/223–229, 203, 219, 250
See application file for complete search history.

(56) References Cited

U.S. PATENT DOCUMENTS

| | | | | |
|---|---|---|---|---|
| 6,912,569 | B1 * | 6/2005 | Sharma et al. | 709/223 |
| 7,895,356 | B2 * | 2/2011 | Shiina | 709/238 |
| 2004/0122871 | A1 * | 6/2004 | Hansen et al. | 707/204 |
| 2008/0016129 | A1 * | 1/2008 | Edlund et al. | 707/204 |
| 2008/0195755 | A1 * | 8/2008 | Lu et al. | 709/241 |

* cited by examiner

*Primary Examiner* — Zarni Maung
(74) *Attorney, Agent, or Firm* — Donald B. Paschburg; F. Chau & Associates, LLC

(57) ABSTRACT

A network of replicated servers providing a service includes a plurality of server replicas. A leader is elected from among the plurality of server replicas for coordinating ordering of operations among the plurality of server replicas. A view change protocol is executed by the plurality of server replicas after the election of the leader. Each iteration of the view change protocol corresponds to a unique view number. The server replicas are directed by the view change protocol to cooperate to order operations by exchange of information associated with particular view numbers. The information is prioritized in accordance with the view numbers. The non-leaders monitor the response time of the leader and elect a new leader when it is determined that the monitored length of time is greater than a threshold value that is dependent upon current network conditions.

22 Claims, 11 Drawing Sheets

REPLICATED STATE MACHINE UTILIZING VIEW CHANGE PROTOCOL RESILIENT TO PERFORMANCE ATTACKS

CROSS-REFERENCE TO RELATED APPLICATION

The present application is based on provisional application Ser. No. 61/468,124 filed Mar. 28, 2011, the entire contents of which are herein incorporated by reference.

TECHNICAL FIELD

The present disclosure relates to state machine systems and, more specifically, to replicated state machine systems and methods utilizing a view change protocol that is resilient to performance attacks.

DISCUSSION OF THE RELATED ART

Traditionally, a single application may be executed on a single computer system. Clients may then utilize the application service by communicating with the single computer system. However, under such a scenario, the provision of the application service is vulnerable to a single point of failure. Accordingly, to provide a more robust and fault-tolerant configuration, the application may be executed simultaneously on multiple computer systems. Clients may then utilize the application service by communicating with any one or more of the multiple computer systems. Approaches such as these may be known as machine replication approaches.

One challenge in machine replication is to harmonize the client interaction between the multiple computer systems so that each of the computer systems (replicas) provides the client with the same results as any of the other replicas. State Machine Replication has emerged to address this challenge. In state machine replication, each replica executes an identical application. The application itself is deterministic so that given the same client request, each replica should provide the same output. However, as the output may be dependent upon an order in which client requests are processed, each of the replicas seeks to process each of the client requests in the same order. By processing the client requests in the same order, the State of each replica may be kept identical.

As different client requests may reach different replicas in different order, the replicas must arrive at a consensus as to a single order for processing client requests that may be adopted by each of the replicas. One family of approaches to creating consensus is called Paxos. Under Paxos, a single replica is elected Leader by the other replicas and the Leader may play a role in resolving conflict between the replicas, for example, by establishing or otherwise canonizing an order in which the client requests are processed by the replicas. In this way the leader establishes an order that is to be followed by the remaining replicas. In establishing the order, the newly elected leader may be said to operate in the context of a new View, which continues until a subsequent new leader is elected and a new View established.

However, in the event that the leader fails, a new leader must be elected. Because the election of the new leader entails the adoption of a new view, the process of electing a new leader is followed by a view change in which the replicas arrive at a consensus as to what client requests have already been ordered as part of previous views and what client requests have been received but not yet ordered and thus whose order should be established as part of the new view. Accordingly, the procedure by which view change is implemented is governed by a View Change Protocol.

Conventional View Change Protocols have been developed to ensure that at each View Change, the replicated application continues to make progress by moving forward consistently but without regard to the rate at which progress is made. While this approach may be acceptable for state machine replications that are subject to occasional malfunctions, application performance may suffer in the event of a sustained malicious attack.

SUMMARY

A network of replicated servers providing a service includes a plurality of server replicas. A leader is elected from among the plurality of server replicas in accordance with a leader election protocol for coordinating ordering of operations among the plurality of server replicas. The remainder of the plurality of server replicas includes non-leaders. A view change protocol is executed by the plurality of server replicas after the election of the leader. Each iteration of the view change protocol corresponds to a unique view number. The view change protocol directs each server replica to broadcast its own state and to cooperate with the other server replicas to determine when a sufficient number of server replicas have received states that were broadcasted by a sufficiently large subset of the plurality of server replicas. Each non-leader is directed to inform the leader when it is determined that the sufficient number of server replicas have received states that were broadcasted by the sufficiently large subset of the plurality of server replicas. The leader is directed to select an official state from among the states broadcast by the server replicas and broadcast the selection of the official state to the non-leaders. Each server replica is directed to agree on the official state selected by the leader. Each server replica is directed to cooperate with the other server replicas to order operations not ordered as part of the official state. The cooperation includes the exchange of information associated with particular view numbers. The information is prioritized in accordance with the view numbers. The non-leaders are directed to monitor a length of time between when the non-leader informs the leader that the sufficient number of server replicas have received states that were broadcasted by the sufficiently large subset of the plurality of server replicas and when knowledge of the official state has been received by the non-leader and to execute the leader election protocol to elect a new leader when it is determined that the monitored length of time is greater than a threshold value that is dependent upon current network conditions.

The operations whose order is coordinated by the leader may include client queries or requests to be processed by the server replicas.

The state of each of the server replicas may be dependent upon what operations were executed by the respective server replica or in what order those operations were executed in.

The server replicas may execute a checkpoint protocol for enabling the server replicas to generate provably-correct checkpoints of their state and then discard messages used to order operations reflected within the state. The states broadcast by the server replicas may include a most recently-acquired checkpoint and the server replicas may determine that they have received the sufficient number of states that were broadcast by the sufficiently large subset of the plurality of server replicas when they have received matching states from a set of 2f+1 server replicas.

The leader may broadcast the selection of the official state to the non-leaders without broadcasting the official state itself.

Prioritizing the information in accordance with particular view numbers may include using only ordering information, for particular operations, having a highest available view number and disregarding ordering information, for particular operations, where a view number is lower than that of other available ordering information.

The length of time between when the non-leader informs the leader that the sufficient number of server replicas have received states that were broadcasted by the sufficiently large subset of the plurality of server replicas and when knowledge of the official state has been received by the non-leader may be finite and measurable with respect to network conditions when the leader is functioning correctly. The network conditions may be assessed by the server replicas by monitoring roundtrip times of messages sent to each other.

The information prioritized in accordance with the view numbers may be bounded to a particular quantity when the server replicas experience cascading failures.

The view change protocol may be tolerant of up to a number f of the server replicas experiencing Byzantine faults where the total number of server replicas is at least 3f+1.

A method for performing view change in a system of replicated servers providing a service includes executing a view change protocol after a leader is elected from among a plurality of server replicas in accordance with a leader election protocol for coordinating ordering of operations among the plurality of server replicas. The remainder of the plurality of server replicas includes non-leaders. Each iteration of the view change protocol corresponds to a unique view number. Server replica states are broadcast from each server replica and it is determined when a sufficient number of server replicas have received states that were broadcasted by a sufficiently large subset of the plurality of server replicas by the exchange of information between the non-leaders. The leader is informed when it is determined that the sufficient number of server replicas have received states that were broadcasted by the sufficiently large subset of the plurality of server replicas. An official state is selected from among the states broadcast by the server replicas and the selection of the official state is broadcast to the non-leaders. The server replicas cooperate to agree upon the official state selected by the leader and to order operations not ordered as part of the official state. The cooperation includes the exchange of information associated with particular view numbers. The information is prioritized in accordance with the view numbers. A length of time between when the non-leader informs the leader that the sufficient number of server replicas have received states that were broadcasted by the sufficiently large subset of the plurality of server replicas and when knowledge of the official state has been received by the non-leader is monitored and the leader election protocol is executed to elect a new leader when it is determined that the monitored length of time is greater than a threshold value that is dependent upon current network conditions.

Each server replica may be directed to cooperate with the other server replicas to order operations not ordered as part of the official state. The cooperation may include the exchange of information associated with particular view numbers. The information may be prioritized in accordance with the view numbers. The operations whose order is coordinated by the leader may include client queries or requests to be processed by the server replicas. The state of each of the server replicas may be dependent upon what operations were executed by the respective server replica or in what order those operations were executed in.

The server replicas may execute a checkpoint protocol for enabling the server replicas to generate provably-correct checkpoints of their state and then discard messages used to order operations reflected within the state.

Prioritizing the information in accordance with particular view numbers may include using only ordering information, for particular operations, having a highest available view number and disregarding ordering information, for particular operations, where a view number is lower than that of other available ordering information.

The length of time between when the non-leader informs the leader that the sufficient number of server replicas have received states that were broadcasted by the sufficiently large subset of the plurality of server replicas and when knowledge of the official state has been received by the non-leader may be finite and measurable with respect to network conditions when the leader is functioning correctly. The network conditions may be assessed by the server replicas by monitoring roundtrip times of messages sent to each other.

The information prioritized in accordance with the view numbers may be bounded to a particular quantity when the server replicas experience cascading failures.

The view change protocol may be tolerant of up to a number f of the server replicas experiencing Byzantine faults where the total number of server replicas is at least 3f+1.

A network of replicated servers providing a service includes a plurality of server replicas. A leader is elected from among the plurality of server replicas. The remainder of the plurality of server replicas includes non-leaders. A view change protocol is executed by the plurality of server replicas after the election of the leader. The view change protocol directs each server replica to cooperate with the other server replicas to determine information pertaining to the state of the server replicas and to send the information pertaining to the state of the server replicas to the leader. The leader is directed to select an official state using the information pertaining to the state of the server replicas received from the server replicas and to transmit the selection of the official state to the non-leaders. Each server replica is directed to cooperate with the other server replicas to order operations not ordered as part of the official state. The non-leaders are directed to monitor a length of time between when the non-leader sends the information pertaining to the state of the server replicas to the leader and when the selection of the official state is received from the leader and to elect a new leader when it is determined that the monitored length of time is greater than a threshold value that is dependent upon current network conditions.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
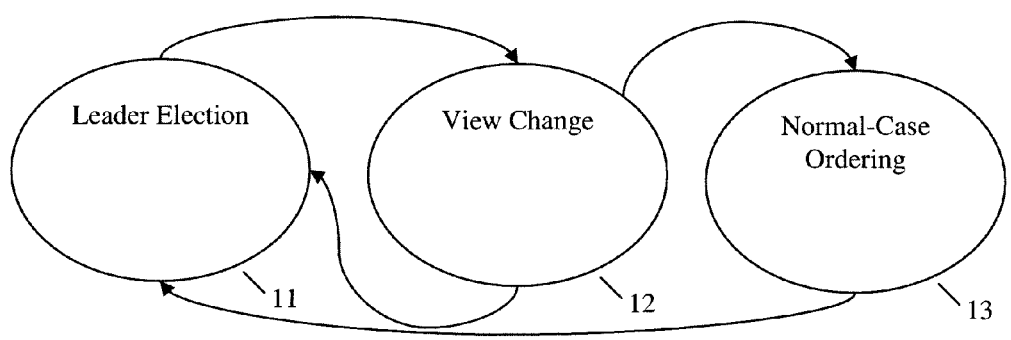
FIG. 1 is a block diagram illustrating a relationship between the protocols for ordering client requests under an existing leader, effecting View Change, and effecting Leader Election according to exemplary embodiments of the present invention.
Figure 2:
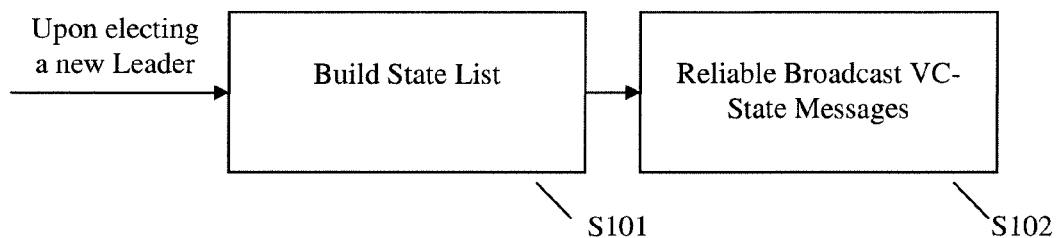
FIGS. 2-10 are a sequence of flow charts illustrating a view change protocol for a replicated state machine according to exemplary embodiments of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide a state machine replication system and method that utilize a View Change Protocol that is capable of maintaining a high degree of performance even under a malicious attack in which the replicas experience cascading failures.

This may be achieved, for example, by placing precise limits on how much time is afforded to the leader to perform each action associated with View Change. While these precise limits may be dependent upon current network conditions, exemplary embodiments of the present invention seek to limit the range of tasks performed exclusively by the Leader during View Change and to ensure that each task that is performed exclusively by the Leader during View Change can be expected to occur within a particular period of time. When this particular period of time has elapsed without the leader having performed the expected task, leader replacement may be performed. This may include, for example, ensuring that the Leader is not relied upon to exclusively perform a task that is open-ended and may require an indeterminate length of time to complete. By ensuring that the Leader is only relied upon to exclusively perform tasks that do not require an indeterminate length of time to complete, exemplary embodiments of the present invention may utilize a View Change Protocol that more effectively monitors the performance of the Leader during View Change and in so doing ensures a high degree of performance, even under less-than-ideal conditions such as a sustained malicious attack that creates cascading failures among the replicas.

For example, existing View Change Protocols may necessitate the maintenance of protocol status across different instances of the view change protocol. Accordingly, if the View Change Protocol is executed repeatedly within a relatively short period of time, for example, where multiple replicas are experiencing cascading failures, the statuses of each protocol change must be maintained. As the number of maintained statuses increases, the time required for the new leader to perform View Change may increase. As the remaining replicas may not have knowledge of the number of states required to be maintained, it may be difficult to establish a reasonable timeout period. To address this difficulty, many existing View Change Protocols may rely upon a timeout-doubling by which at each successive View Change, the timeout period doubles. However, in the event of cascading failure this timeout period may become excessively large and accordingly, a compromised leader may be able to contribute significant delay to the performance of the replica system.

Exemplary embodiments of the present invention may use the View Change Protocols disclosed herein in conjunction with leader-based state machine replication protocols. The View Change Protocols disclosed herein may be used to guarantee ordering consistency for the processing of client requests across leader changes.

The View Change protocols described herein may operate in the context of a leader-based state machine replication protocol. When the server replicas begin running, they may elect a leader whose job it is to coordinate the ordering protocol. A leader may be said to coordinate a view and each view may be provided with a unique view number. If the leader is ultimately replaced and a new leader is elected, the view number may be incremented and a new view may be installed. Before each replica may participate in the ordering protocol of the new view, that replica may run the View Change protocol to wrap up the ordering of any pending operations. Pending operations may be, for example, operations whose ordering was proposed by the previous leader but have not yet been completed. By having each replica execute the View Change protocol, the ordering decisions made by the new leader may be made to respect any previously agreed upon ordering operations. After the view change protocol completes, the replicas may begin to participate in the ordering protocol of the new view.

FIG. 1 is a block diagram illustrating a relationship between the protocols for ordering client requests under an existing leader, effecting View Change, and effecting Leader Election according to exemplary embodiments of the present invention. As may be seen in the figure, ordering may be coordinated, in the ordinary course, by a leader using an ordering protocol 13. When the leader is not performing in accordance with the predetermined constraints, a leader election protocol 11 may be executed at each replica. Election of the new leader may then be followed by the execution of the view change protocol 12 at each replica. During the execution of the view change protocol, each replica may monitor the performance of the leader. If the performance of the leader during the monitoring of the view change protocol is viewed to be below that of dynamically determined constraints, the leader election protocol 11 may be re-executed. However, if the performance of the leader during the monitoring of the view change protocol is viewed to be satisfactory, normal-case ordering 13 may be performed.

The view change protocol described herein may be a Byzantine fault-tolerant algorithm such that the protocol may work correctly regardless of whether failed replicas simply cease functioning or if failed replicas produce spurious results or results specifically designed to cause disruption to the system. The protocol may assume an upper bound on the ratio of faulty to correct participants. Specifically, to tolerate "f" Byzantine faults, the protocol may require at least 3f+1 replicas. It may be possible for additional non-Byzantine faults to be supported. Under such a requirement, the system may only continue to assure proper function as long as less than one third of the replicas are Byzantine. It may also be assumed that functioning participants faithfully execute the steps of the protocol.

The system may also assume a public key infrastructure, whereby each replica may have a public/private key pair that it may use to generate and verify digital signatures. The protocol is described below under the assumption that all messages sent between replicas are digitally signed. However, exemplary embodiments of the present invention are not specifically limited to the use of digitally signed messages and other means for assuring the integrity of messages may be used. For example, in implementations of the protocol, not all messages need to be digitally signed and symmetric key-based message authentication codes may be used instead for some messages to reduce the protocol's computational cost.

The first phase of the view change protocol according to exemplary embodiments of the present invention may use an asynchronous Byzantine fault-tolerant reliable broadcast protocol to disseminate certain state messages. The reliable broadcast protocol may support both the reliable broadcast of a message and reliable delivery of a message. Each message may be assigned a tag. For so long as no more than f of the 3f+1 participants are Byzantine, the protocol may have the following properties:

A message m that is reliably broadcast from a functioning replica will eventually be reliably delivered by that functioning replica.

If one functioning replica reliably delivers message m then all functioning replicas will eventually reliably deliver message m.

If two functioning replicas reliably deliver message m and message m' with the same tag, then m=m'.

The view change protocol in accordance with exemplary embodiments of the present invention may operate within a system supporting various other protocols, some of which are described in detail below.

For example, a leader election protocol 11 may be used by the replicas to elect a new leader when the current leader is suspected of having failed. The leader election protocol may not be triggered unilaterally by Byzantine servers. For example, f+1 replicas may be required to initiate leader election. The view change protocol may begin when the leader election protocol completes.

For example, an ordering protocol 13 may be used to ensure that functioning server replicas apply the same operations (e.g., processing of client requests) in the same order as that of the other functioning replicas. The ordering protocol may be coordinated by the current elected leader and may ensure consistency between the functioning replicas. Each operation may be assigned a global sequence number.

For example, a leader monitoring protocol may be used to ensure that a faulty leader does not halt progress indefinitely by having each replica continuously monitor the leader to ensure that it is operating within the required performance bounds. If a replica suspects the leader to have failed, it may vote to replace the leader by invoking the leader election protocol. The monitoring protocol may dynamically adapt to changing network conditions so that the required performance bounds take into consideration any delays that may be caused by network conditions. For example, the monitoring protocol may measure roundtrip times and use this measurement in determining the leader's level of expected performance. Such a monitoring protocol may be used in accordance with exemplary embodiments of the present invention instead of the timeout-doubling approach discussed above.

For example, a checkpoint protocol may be used to facilitate garbage collection by enabling the replicas to generate provably-correct snapshots of the system state. The system state may encompass operations that have already been performed and accordingly, once the snapshot has been generated, data concerning messages pertaining to the performed operations may be discarded. The output of the checkpoint protocol may be a provably-correct checkpoint certificate. The checkpoint certificate may be associated with the global sequence number of the last operation reflected in the checkpoint. The checkpoint protocol may operate in parallel with the ordering protocol.

The view change protocol according to exemplary embodiments of the present invention may utilize a variety of message types, many of which are described below. Each message, regardless of type, may have a header including one or more of a digital signature, sender's server identifier, an indication of message type, and data length, e.g., the total measure of the length of the message excluding the header. Message types may include an RBCAST message, a VC-State Message, a VC-List Message, a VC-List-Ack Message, a VC-Replay-Message, a VC-Replay-Ack Message, a Joint-Pre-Prepare Message, a Prepare Message, and a Commit Message.

The Reliable Broadcast (RBCAST) message may include a unique tag, a type (e.g., one of RB-Init, RB-Echo, or RB-Ready) and message contents. The RBCAST message may be used by a given replica to send a message to the other replicas with an assurance that all other functioning replicas will receive the sent message.

The View Change state (VC-State) message may include a view number representing the new view number being installed, an originator identifying the server of the message sender, a packet index value within a range from 1 to the total number of packets, the total number of packets (Total Packets) representing the total number of VC-State messages reliably broadcast in the present view, the Data Length representing the total number of bytes of data to follow, and the message contents. The VC-State message may be sent in the first phase of the view change protocol. The VC-State message may include information pertaining to the present state of the originating replica. The VC-State message may be reliably broadcast.

A server receiving reliable delivery of a sufficient number of VC-State messages may send a VC-List message. The VC-List message may include the view number for the new view being installed and a list of 2f+1 server identifiers identifying each of the replicas from which a complete set of VC-State messages was received.

Each replica may then acknowledge receipt of the VC-List message with the sending of a VC-List-Ack message. The VC-List-Ack message may include the view number identifying the new view being installed, the originator of the VC-List being acknowledged, the list of 2f+1 server identifiers from the VC-List being acknowledged, the starting sequence number of a replay window, the ending sequence number of the replay window, and the checkpoint wave signifying the highest numbered checkpoint certificate found in the state sets of the 2f+1 servers in the list.

After collecting 2f+1 matching VC-List-Ack messages where each of the 2f+1 messages was originated by a different server, the leader of the new view being installed may send a VC-Replay message including a view number of the new view being installed, and the 2f+1 matching VC-List-Ack messages.

The VC-Replay messages may be acknowledged by the sending of a VC-Replay-Ack message which may include the view number of the new view being installed, the checkpoint wave indicating the highest-numbered checkpoint found in the state sets of the 2f+1 servers in the VC-List-Ack message found in the VC-Replay being acknowledged, a starting sequence number of the replay window, an ending sequence number of the replay window, an Rbcast List containing 2f+1 server identifiers, and an Ackers List containing 2f+1 server identifiers.

To replay those operations whose ordering was pending at the time of the view change, Joint-Pre-Prepare messages may be used. The Joint-Pre-Prepare message may include a view number of the new view being installed, a global sequence number of the operation being replayed, a wave used by the ordering protocol, and reconcilers used by the ordering protocol.

The final ordering may then be established via the Prepare and Commit messages. These messages may be part of the ordering protocol and may form a bridge between the view change protocol and the ordering protocol. The Prepare message may include a view number indicating the new view being installed, the global sequence number of the operation being ordered, the wave used by the ordering protocol, and the reconcilers used by the ordering protocol. Similarly, the Commit message may include the view number of the new view being installed, the global sequence number of the operation being ordered, the wave used by the ordering protocol, and the reconcilers used by the ordering protocol.

The manner of use for each of the above-identified messages will be described in detail below with reference to FIGS. 2-10 including a sequence of flow charts illustrating a view change protocol for a replicated state machine according to exemplary embodiments of the present invention. It is to be understood that in each figure, a functional element of the view change protocol is described. As each of the replicas may use the same view change protocol, the steps described herein may represent the steps that may be taken by any, some, or all of the various replica servers of the system when subject to the preconditions shown in the figure and described in the specification. Accordingly, the various steps shown and described may be understood as behaviors of each of the replicas utilizing the view change protocol, and not necessarily the behavior of one particular replica.

The view change protocol may begin upon the electing of a new leader. As discussed above, each replica server may initiate the view change protocol. As may be seen in FIG. 2, first, the replica server may build a state list containing the state that the replica is to disseminate during the view change (Step S101). The state list may include the latest stable checkpoint certificate that the server has collected, if any. A stable checkpoint certificate may be a set of 2f+1 matching checkpoint messages having the same global sequence number, wave field, and state digest where each of the 2f+1 messages was originated by a different server. The state list may also include zero or more prepare certificates. To add the prepare certificate to the state list, a variable seq may be defined as either the global sequence number of the replica's latest stable checkpoint or zero if no stable checkpoint certificate exists. The variable maxPC may be defined as the maximum global sequence number for which the replica has collected a prepare certificate. For each global sequence number i from seq+1 up to and including maxPC for which the replica has collected a Prepare Certificate, the latest such Prepare Certificate may be added from i to the state list.

Next, the replica reliably broadcasts the contents of its state list in a collection of VC-State messages (Step S102). The reliable broadcasting tag associated with each message may include the following triple: <viewNumber, serverID, packetIndex>. The serverID field may refer to the identifier of the server initiating the reliable broadcast. The packetIndex field may range from 1 to the total number of VC-State messages being reliably broadcast in this step. The VC-State messages may be packed into a smaller number of RBCAST packets where desired. The RBCAST messages that carry the VC-State messages may use message authentication codes instead of digital signatures where desired.

Figure 3:
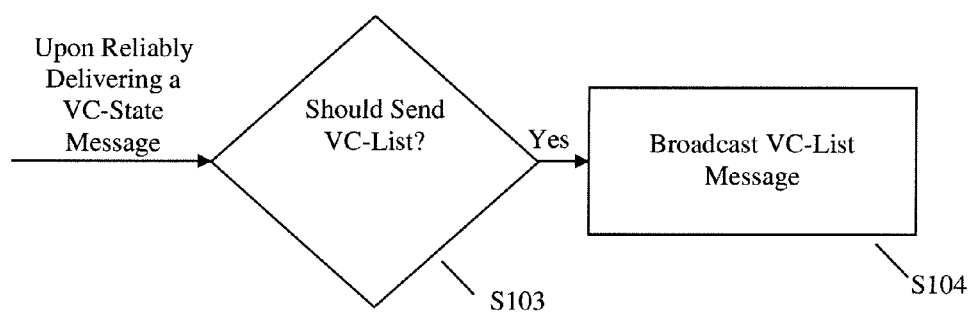

As may be seen in FIG. 3, upon the reliable delivery of the VC-State message which was sent in Step S102, a replica may make a determination as to whether to send a VC-List message out to the other replicas (Step S103). The replica may send the VC-List message if (1) the reliable delivery of the current VC-State message indicates that this replica has now collected a complete state from 2f+1 different replicas in this view, and (2) this replica has not already sent a VC-List message in the current view. A replica i is said to "collect complete state" from replica j when i reliably delivers all of j's VC-State messages for the current view. If both conditions (1) and (2) hold, the replica may broadcast its VC-List message to the other replicas (Step S104). The VC-List message may contain the view number and the 2f+1 identifiers of the replicas from which this replica has collected complete state. Because the VC-List message is only sent if the replica has not already sent a VC-List message in the current view, each replica only sends at most one VC-List message per view. The VC-List messages may also use message authentication codes instead of digital signatures where desired.

Figure 4:
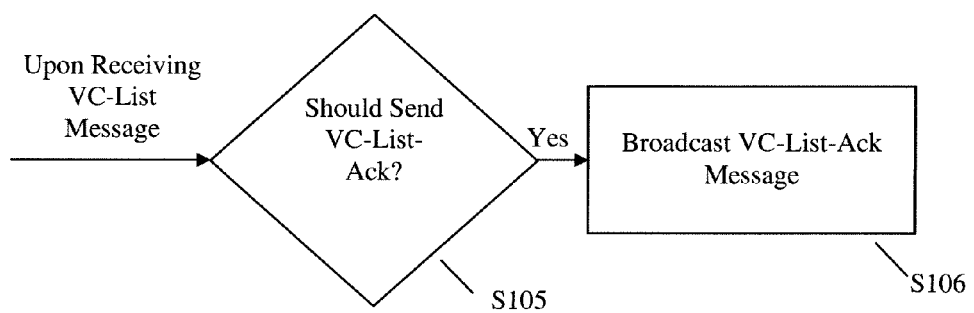

As may be seen in FIG. 4, upon receiving the VC-List message, a replica may determine if it should send a VC-List-Ack message (Step S105). A replica i may send a VC-List-Ack message in response to a VC-List message from replica j if (1) replica i has collected complete state information from the 2f+1 replicas in the list, and (2) replica i has not already sent a VC-List-Ack in response to a VC-List message from replica j in this view. Where both conditions (1) and (2) are satisfied, replica i may broadcast a VC-List-Ack message (Step S106).

The VC-List-Ack message may include the boundaries of the replay window implied by the state set of the 2f+1 servers in the list. The start of the replay window may be the global sequence number that is one higher than the global sequence number of the latest stable checkpoint certificate found among the 2f+1 state sets. The end of the replay window is the global sequence number of the highest-numbered Prepare Certificate found among the 2f+1 state sets. Accordingly, each properly functioning replica may send at most 3f+1 VC-List-Ack messages in each view, which may be at most one VC-List-Ack message for each server. The VC-List-Ack message should be digitally signed.

Figure 5:
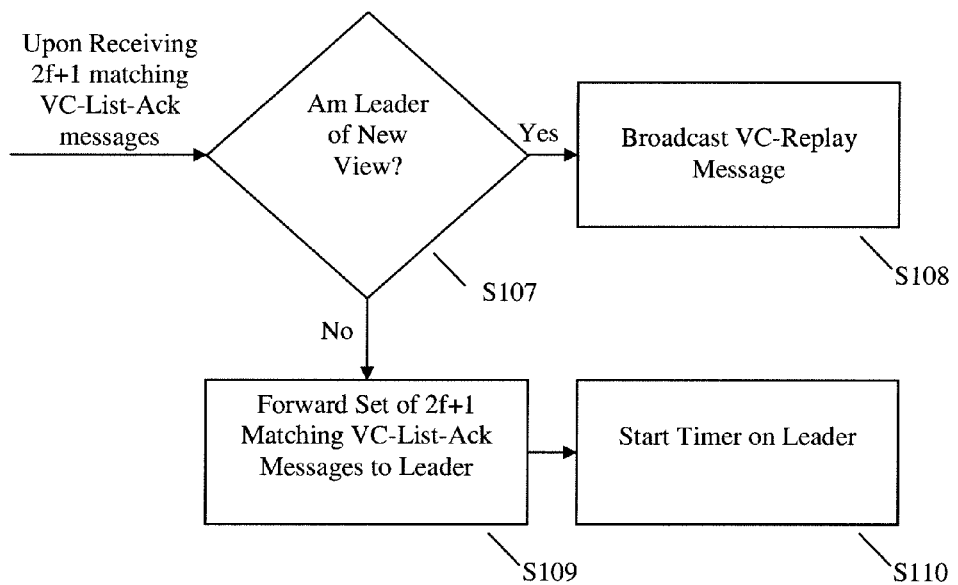

As may be seen in FIG. 5, upon receiving 2f+1 matching VC-List-Ack messages with matching content from different servers, the receiving server may first determine whether it is the leader of the new view (Step S107) as the action taken may depend on this determination. If the receiving server determines that it is the leader of the new view (Yes, Step S107), then it may broadcast a VC-Replay message (Step S108). The VC-Replay message may represent the leader's choice for which set of 2f+1 state sets the servers will ultimately use when determining how to resolve the outcome of pending operations. The sending of the VC-Replay message may rely upon the actions of a single server, here the leader. This may stand in contrast with the other aspects of the view change protocol which may not rely on the actions of a single server. Accordingly, as this step is leader-dependent, the performance of this step is monitored by the non-leader servers so that they may ensure that the leader is acting in a timely manner. It is accordingly a feature of exemplary embodiments of the present invention that the timely performance of every step that is to be performed exclusively by the leader be monitored by the remaining replica servers and that a measure of a reasonable length of time for the performance of these leader-dependent steps be both measurable and bounded, as opposed to the timeout-doubling approach discussed above where the timeout period is unbounded and potentially excessively large.

If, however, the receiving server determines that it is not the leader of the new view (No, Step S107), then the server may forward to the leader the set of 2f+1 matching VC-List-Ack messages that it has collected, where each of the 2f+1 messages was originated by a different server (Step S109). A properly functioning leader may be able to immediately use this set of messages to build and send a VC-Replay message, if it has not already done so. Accordingly, the server may start a timer at this point to gauge how long it takes the leader to send the VC-Replay message (Step S110). This timer may be stopped upon receiving a valid VC-Replay message from the current view. Thus, the timer may be used to measure the time between the sending the set of VC-List-Ack messages to the leader and receiving a valid VC-Replay message. This value may be used by, for example, a leader monitoring protocol so that a faulty leader who tries to delay the sending of the VC-Replay message may be quickly removed from power and a new leader may be elected.

Figure 6:
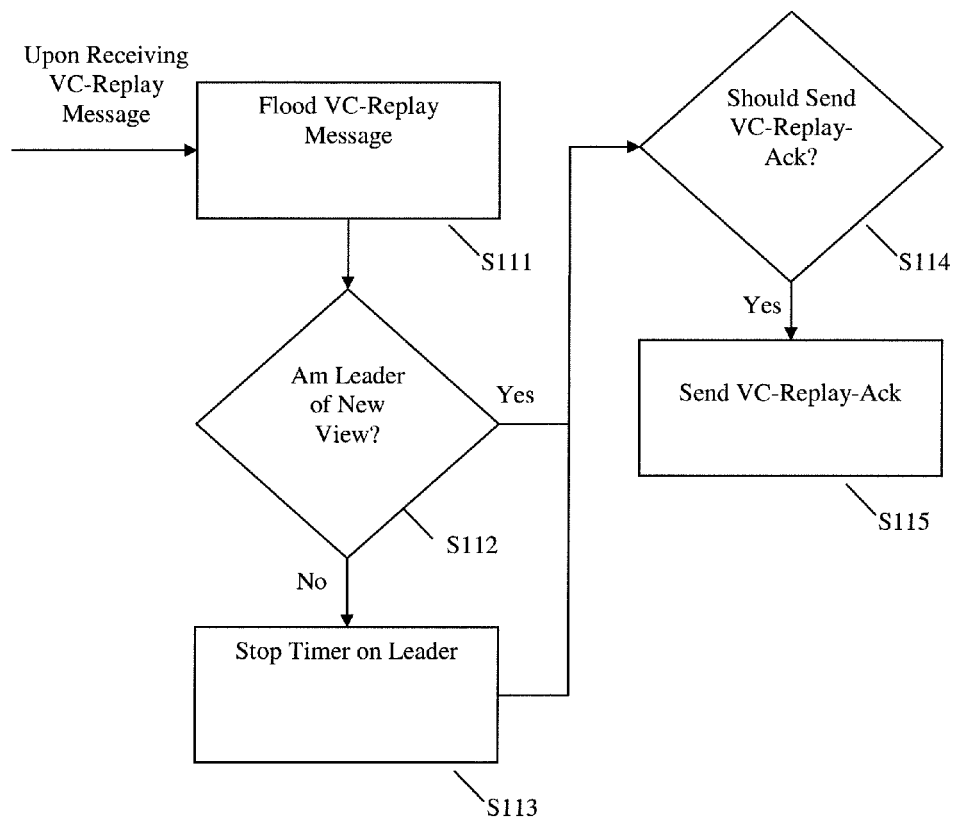

As may be seen in FIG. 6, upon receiving a VC-Replay message from the leader for the first time in the particular view, the receiving replica may flood the VC-Replay message to the other servers (Step S111). The flooding step may ensure that if any functioning servers receive the VC-Replay message then all of the other functioning servers will receive it. This step may accordingly remove the ability of a leader that has experienced a Byzantine failure to delay progress by sending the VC-Replay to some functioning servers but not to others. This step may also enable functioning servers to compare the VC-Replay message they received from the leader with VC-Replay messages they received from other servers to ensure that only one VC-Replay message is being sent per view. Where a server detects that the leader has sent two different VC-Replay messages in the same view, that server may immediately vote to replace the leader by attempting to garner enough support to trigger the leader election protocol.

Next, the receiving server may determine whether it is the leader of the new view (Step S112). If the server is not the leader (No, Step S112), then the timer set in Step S110 may be stopped (Step S113). Thereafter, or in the event that the server determines that it is the leader, the server may determine whether it should send a VC-Replay-Ack message (Step S114). Accordingly, both the leader server and the non-leader servers may make this determination. A server may send the VC-Replay-Ack message if (1) the VC-Replay message was sent by the leader and contains 2f+1 matching VC-List-Ack messages, where each of the 2f+1 messages was originated by a different server, and (2) the server has not already sent a VC-Replay-Ack message in this view. If both conditions are satisfied (Yes, Step S114), then the server may broadcast a VC-Replay-Ack message (Step S115). As stated above, the VC-Replay-Ack message may include an Rbcast list field including 2f+1 server identifiers of those server appearing in the list of the 2f+1 VC-List-Ack messages contained in the VC-Replay message. The Ackers List field may include the 2f+1 server identifiers of the originators of the VC-List-Ack messages contained in the VC-Replay message. Accordingly, each acker has acknowledged collecting complete state from the 2f+1 servers in the Rbcast List.

Figure 7:
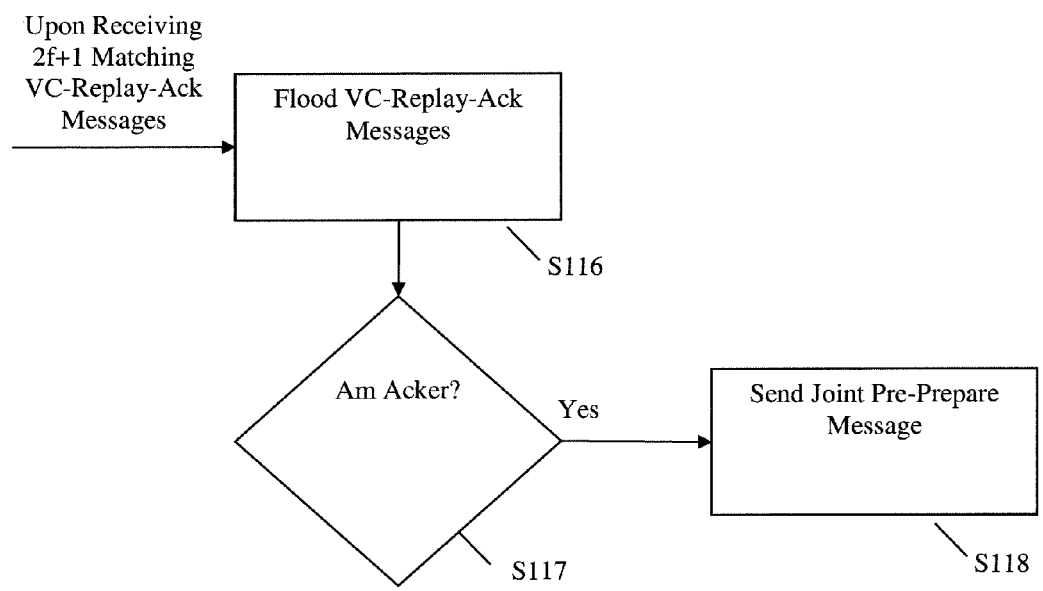

As may be seen in FIG. 7, upon a server receiving 2f+1 matching VC-Replay-Ack messages, where each of the 2f+1 messages was originated by a different server, the receiving server may flood the set of matching VC-Replay-Ack messages to the other servers (Step S116). Performance of this step is optional and may be omitted; however, performing this step may reduce the total time of the view change by more quickly advancing the servers to enter a state in which the view change can be terminated. The receiving server may then determine whether it is an acker (Step S117). As used herein, an acker is a server whose VC-List-Ack message is among the 2f+1 VC-List-Ack messages contained in the leader's VC-Replay message. The acker is accordingly a server that has collected complete state from the 2f+1 servers in the corresponding VC-List message that is acknowledged by the 2f+1 matching VC-List-Ack messages. Accordingly, a server may be an acker if that server appears in the Ackers List field of the matching VC-Replay-Ack messages.

If the server is an acker (Yes, Step 117) then it may generate a Joint-Pre-Prepare message for each global sequence number in the replay window (Step S118). The boundaries of the replay window may be computed as a function of the state sets of the 2f+1 servers in the Rbcast list of the matching VC-Replay-Ack messages, where each of the 2f+1 messages was originated by a different server. The start of the replay window is the global sequence number one higher than that of the global sequence number of the latest stable checkpoint certificate found among the 2f+1 state sets. The end of the replay window may be the global sequence number of the highest-numbered Prepare Certificate found among the 2f+1 state sets.

For each global sequence number in the replay window, each acker generates a Joint-Pre-Prepare message. The Joint-Pre-Prepare message may be generated by determining whether a Prepare Certificate exists. If it exists, then the wave and reconcilers fields from one of the Prepare messages may be copied into the Joint-Pre-Prepare message. If, however, no Prepare Certificate exists, then the null vectors may be used for the wave and reconcilers fields of the Joint-Pre-Prepare and the new view number may be used.

Each acker may use the same 2f+1 state sets when performing the above procedure. This may be guaranteed by the properties of the asynchronous Byzantine fault-tolerant reliable broadcast protocol. For example, an acker examining the state set of a first server may be guaranteed to be examining the same exact state set as any other acker examining the state set of another server. Therefore each acker may generate identical Joint-Pre-Prepare messages, with the exception of the server identifier field in the message header. Since at least f+1 of the 2f+1 ackers must be properly functioning, any server that collects f+1 matching Joint-Pre-Prepare messages for the same global sequence number must necessarily collect messages with the same content such as the same wave and reconcilers fields. Accordingly, the set of f+1 matching Joint-Pre-Prepare messages proposes an ordering, just as if the ordering were proposed by a single correct leader.

Figure 8:
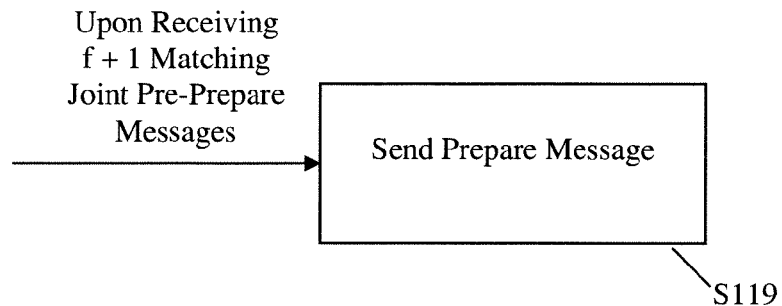

As may be seen in FIG. 8, upon receiving f+1 matching joint Pre-Prepare messages for the same global sequence number, where each of the f+1 messages was originated by a different server, the receiving server may broadcast a Prepare message (Step S119).

Figure 9:
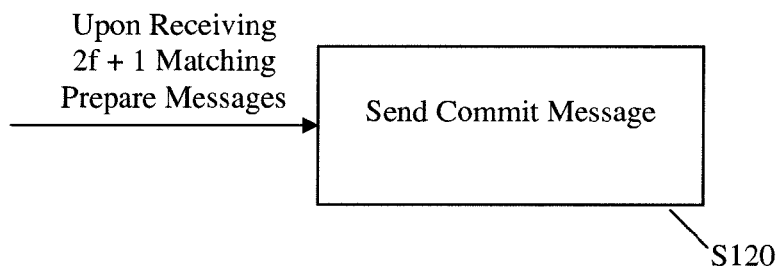

As may be seen in FIG. 9, upon receiving 2f+1 matching Prepare messages, for the same global sequence number, the receiving server may broadcast a Commit message (Step S120). According to exemplary embodiments of the present invention, a server replica may send 0,1, or more Joint-Pre-Prepare, Prepare, and Commit messages in a given view, but no more than 1 Joint-Pre-Prepare, 1 Prepare, and 1 Commit for any given sequence number in the replay window.

Figure 10:
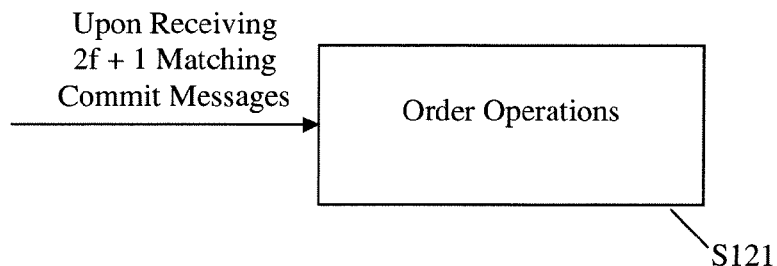

As may be seen in FIG. 10, upon receiving 2f+1 matching Commit messages, for the same global sequence number, where each of the 2f+1 messages was originated by a different server, the receiving server may Order the operations (Step S121).

Figure 11:
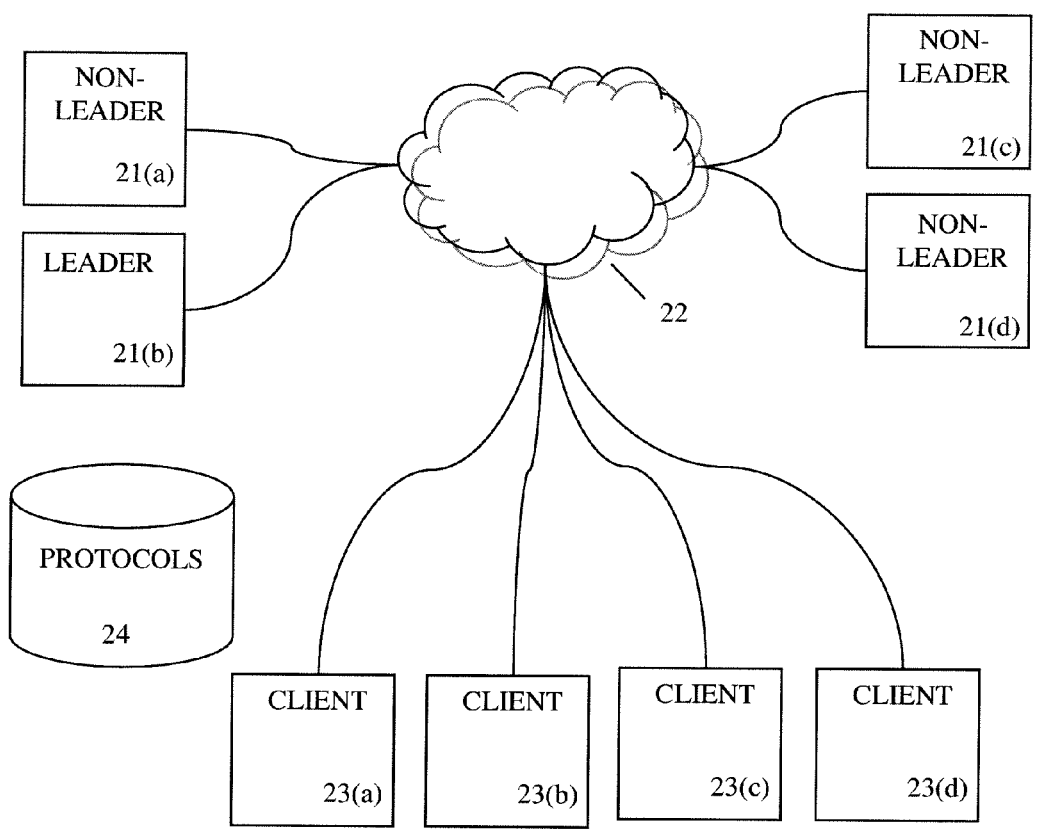
FIG. 11 is a block diagram illustrating a network of replicated servers for providing a service according to exemplary embodiments of the present invention.

FIG. 11 is a block diagram illustrating a network of replicated servers for providing a service according to exemplary embodiments of the present invention. The network may include a plurality of replica servers 21(a), 21(b), 21(c), and 21(d). While only four replica servers are shown, it is to be understood that there may be any number of replica servers. The number of replica servers required may be dictated by the desired tolerance for the number of servers which may experience Byzantine faults as described above. A leader 21(b) may be elected from among the plurality of replica servers 21(a)-21(d). The remaining replica servers 21(a), 21(c), and 21(d) may be non-leaders. The replica servers 21(a)-21(d) may be connected to each other locally and/or over a wide area network 22, which may be, for example, the Internet.

A set of protocols 24 may be made available to each of the replica servers 21(a)-21(d). The set of protocols 24 may include a leader election protocol, a view change protocol, an ordering protocol, a checkpoint protocol, and/or any other required protocol such as those discussed above. Code for executing the protocols 24 may be embodied in a database and may be made accessible to, for example, it may be replicated at, each replica server 21(a)-21(d).

A plurality of clients 23(a)-23(d) may be in communication with the plurality of replica servers 21(a)-21(d) either directly or through the wide area network 22. Each client 23(a)-23(d) need not be in contact with every replica server 21(a)-21(d) and accordingly, some clients 23(a)-23(d) might only be in contact with some replica servers 21(a)-21(d).

Figure 12:
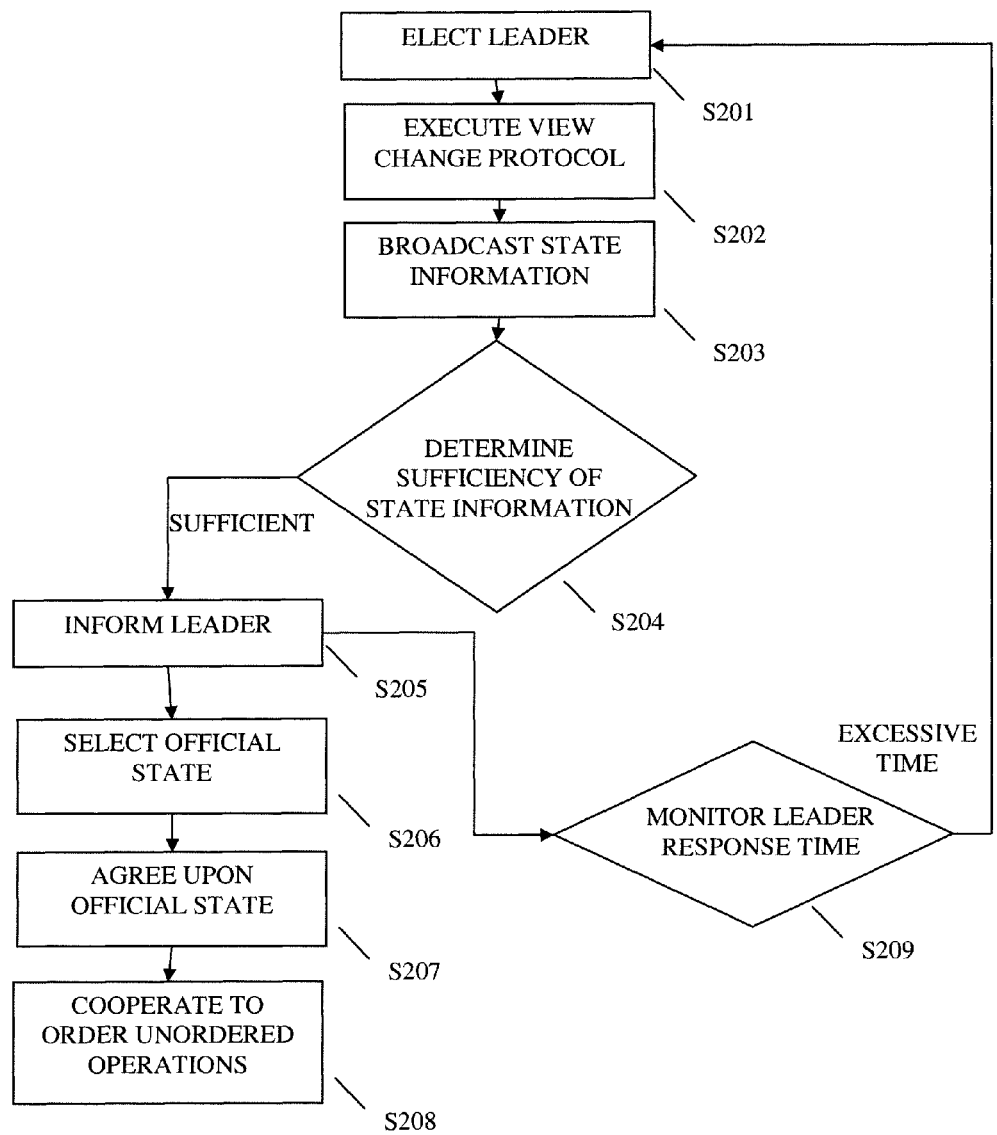
FIG. 12 is a flow chart illustrating a method for performing view change in a system of replicated servers providing a service according to exemplary embodiments of the present invention.

FIG. 12 is a flow chart illustrating a method for performing view change in a system of replicated servers providing a service according to exemplary embodiments of the present invention. After a leader is elected (Step S201), a new view change protocol may be executed by the replica servers (Step S202). As part of the execution of the view change protocol, each of the replica servers may broadcast state information (Step S203). The broadcasting of the state information may include, for example, the building of the state list (FIG. 2, S101), the reliable broadcasting of the VC State Message (FIG. 2, S102), and the broadcasting of the VC-List Message (FIG. 3, S104), as described above. A determination may then be made as to whether sufficient state information has been broadcast and received (Step S203). This step may include, for example, the determination as to whether the VC-List-Ack should be sent (FIG. 4, S105) and the broadcasting of the VC-List-Ack Message (FIG. 4, S106). The leader may then be informed when sufficient state information has been broadcast and received (Step S205). This step may include, for example, the forwarding of the set of 2f+1 matching VC-List-Ack messages to the leader (FIG. 5, Step S109).

Then an official state may be selected by the leader (Step S206). This step may include, for example, the receiving of the 2f+1 matching VC-List-Ack messages and the broadcasting of the VC-Replay Message (FIG. 5, Step S108). Then, the replica servers may agree upon the official state (Step S207). This step may include, for example, the flooding of the VC-Replay message (FIG. 6, Step S111) and the sending of the VC-Replay-Ack (FIG. 6, Step S115).

Each server replica may be directed to cooperate with the other server replicas to order operations not ordered as part of the official state (Step S208). This cooperation may include the exchange of information associated with particular view numbers. The information may be prioritized in accordance with the view numbers. Performance of this step may include the steps of sending the joint-pre-prepare message (FIG. 7, S118), sending the prepare message (FIG. 8, S119), sending the commit message (FIG. 9, S120), and ordering the operations (FIG. 10, S121), for example, as described in detail above.

The leader may be monitored by the replica servers for excessive response time (Step S209). This step may take place independently of the leader. Monitoring may occur upon informing the leader in Step S205 and once the official state is agreed upon in Step S207, performance of the view change protocol cannot be unduly slowed by the leader. This step may include, for example, the starting of the timer on the leader (FIG. 5, Step S110) and the stopping of the timer on the leader (FIG. 6, S113).

Figure 13:
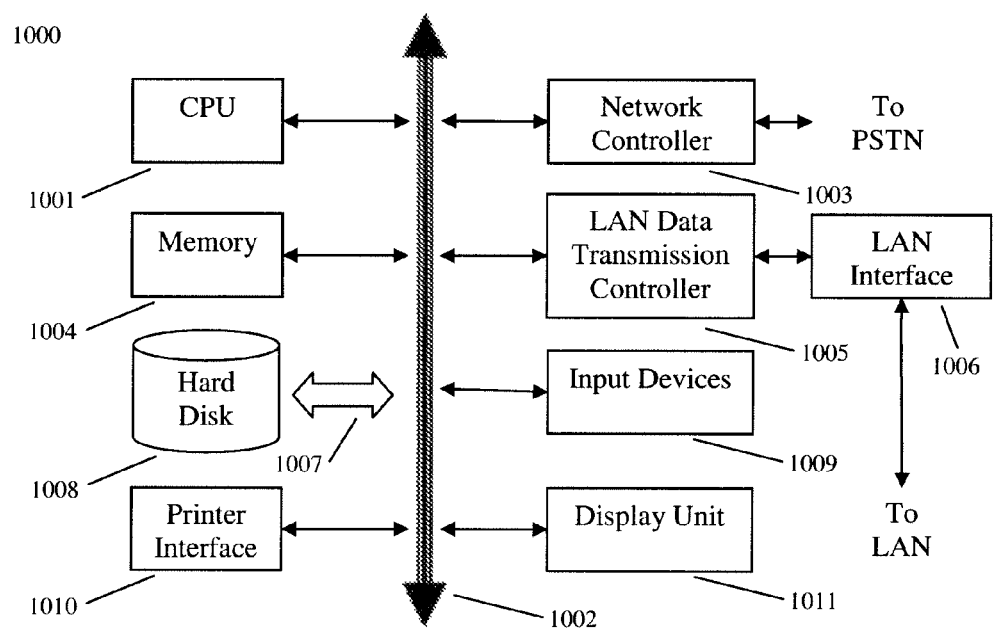
FIG. 13 shows an example of a computer system capable of implementing the method and apparatus according to embodiments of the present disclosure.

FIG. 13 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A network of replicated servers providing a service, comprising:

a plurality of server replicas;

a leader elected from among the plurality of server replicas in accordance with a leader election protocol for coordinating ordering of operations among the plurality of server replicas, the remainder of the plurality of server replicas being non-leaders; and a view change protocol executed by the plurality of server replicas after the election of the leader, each iteration of the view change protocol corresponding to a unique view number, wherein the view change protocol:

directs each server replica to broadcast its own state and to cooperate with the other server replicas to determine when a sufficient number of server replicas have received states that were broadcasted by a sufficiently large subset of the plurality of server replicas;

directs each non-leader to inform the leader when it is determined that the sufficient number of server replicas have received states that were broadcasted by the sufficiently large subset of the plurality of server replicas;

directs the leader to select an official state from among the states broadcast by the server replicas and broadcast the selection of the official state to the non-leaders;

directs each server replica to agree on the official state selected by the leader;

directs each server replica to cooperate with the other server replicas to order operations not ordered as part of the official state, said cooperation including the exchange of information associated with particular view numbers, wherein said information is prioritized in accordance with said view numbers; and directs the non-leaders to monitor a length of time between when the non-leader informs the leader that the sufficient number of server replicas have received states that were broadcasted by the sufficiently large subset of the plurality of server replicas and when knowledge of the official state has been received by the non-leader, and to execute the leader election protocol to elect a new leader when it is determined that the monitored length of time is greater than a threshold value that is dependent upon current network conditions.

2. The network of replicated servers of claim 1, wherein the operations whose order is coordinated by the leader include client queries or requests to be processed by the server replicas.

3. The network of replicated servers of claim 1, wherein the state of each of the server replicas is dependent upon what operations were executed by the respective server replica or in what order those operations were executed in.

4. The network of replicated servers of claim 1, wherein the server replicas execute a checkpoint protocol for enabling the server replicas to generate provably-correct checkpoints of their state and then discard messages used to order operations reflected within the state.

5. The network of replicated servers of claim 4, wherein the states broadcast by the server replicas include a most recently-acquired checkpoint and the server replicas determine that they have received the sufficient number of states that were broadcast by the sufficiently large subset of the plurality of server replicas when they have received matching states from a set of 2f+1 server replicas.

6. The network of replicated servers of claim 1, wherein the leader broadcasts the selection of the official state to the non-leaders without broadcasting the official state itself.

7. The network of replicated servers of claim 1, wherein prioritizing the information in accordance with particular view numbers includes using only ordering information, for particular operations, having a highest available view number and disregarding ordering information, for particular operations, where a view number is lower than that of other available ordering information.

8. The network of replicated servers of claim 1, wherein the length of time between when the non-leader informs the leader that the sufficient number of server replicas have received states that were broadcasted by the sufficiently large subset of the plurality of server replicas and when knowledge of the official state has been received by the non-leader is finite and measurable with respect to network conditions when the leader is functioning correctly.

9. The network of replicated servers of claim 8, wherein the network conditions are assessed by the server replicas by monitoring roundtrip times of messages sent to each other.

10. The network of replicated servers of claim 1, wherein the information prioritized in accordance with said view numbers is bounded to a particular quantity when the server replicas experience cascading failures.

11. The network of replicated servers of claim 1, wherein the view change protocol is tolerant of up to a number f of the server replicas experiencing Byzantine faults where the total number of server replicas is at least 3f+1.

12. A method for performing view change in a system of replicated servers providing a service, comprising:

executing a view change protocol after a leader is elected from among a plurality of server replicas in accordance with a leader election protocol for coordinating ordering of operations among the plurality of server replicas, the remainder of the plurality of server replicas being non-leaders, each iteration of the view change protocol corresponding to a unique view number;

broadcasting server replica states, from each server replica, and determining when a sufficient number of server replicas have received states that were broadcasted by a sufficiently large subset of the plurality of server replicas by the exchange of information between the non-leaders;

informing the leader when it is determined that the sufficient number of server replicas have received states that were broadcasted by the sufficiently large subset of the plurality of server replicas;

selecting an official state from among the states broadcast by the server replicas and broadcasting the selection of the official state to the non-leaders;

cooperating among the server replicas to agree upon the official state selected by the leader and to order operations not ordered as part of the official state, said cooperation including the exchange of information associated with particular view numbers, wherein said information is prioritized in accordance with said view numbers; and monitoring a length of time between when the non-leader informs the leader that the sufficient number of server replicas have received states that were broadcasted by the sufficiently large subset of the plurality of server replicas and when knowledge of the official state has been received by the non-leader, and executing the leader election protocol to elect a new leader when it is determined that the monitored length of time is greater than a threshold value that is dependent upon current network conditions.

13. The method of claim 12, additionally comprising:

directing each server replica to cooperate with the other server replicas to order operations not ordered as part of the official state, said cooperation including the exchange of information associated with particular view numbers, wherein said information is prioritized in accordance with said view numbers.

14. The method of claim 12, wherein the operations whose order is coordinated by the leader include client queries or requests to be processed by the server replicas.

15. The method of claim 12, wherein the state of each of the server replicas is dependent upon what operations were executed by the respective server replica or in what order those operations were executed in.

16. The method of claim 12, wherein the server replicas execute a checkpoint protocol for enabling the server replicas to generate provably-correct checkpoints of their state and then discard messages used to order operations reflected within the state.

17. The method of claim 12, wherein prioritizing the information in accordance with particular view numbers includes using only ordering information, for particular operations, having a highest available view number and disregarding ordering information, for particular operations, where a view number is lower than that of other available ordering information.

18. The method of claim 12, wherein the length of time between when the non-leader informs the leader that the sufficient number of server replicas have received states that were broadcasted by the sufficiently large subset of the plurality of server replicas and when knowledge of the official state has been received by the non-leader is finite and measurable with respect to network conditions when the leader is functioning correctly.

19. The method of claim 18, wherein the network conditions are assessed by the server replicas by monitoring roundtrip times of messages sent to each other.

20. The method of claim 12, wherein the information prioritized in accordance with said view numbers is bounded to a particular quantity when the server replicas experience cascading failures.

21. The method of claim 12, wherein the view change protocol is tolerant of up to a number f of the server replicas experiencing Byzantine faults where the total number of server replicas is at least 3f+1.

22. A network of replicated servers providing a service, comprising:
- a plurality of server replicas;
- a leader elected from among the plurality of server replicas, the remainder of the plurality of server replicas being non-leaders; and
- a view change protocol executed by the plurality of server replicas after the election of the leader, wherein the view change protocol:
- directs each server replica to cooperate with the other server replicas to determine information pertaining to the state of the server replicas and to send said information pertaining to the state of the server replicas to the leader;
- directs the leader to select an official state using the information pertaining to the state of the server replicas received from the server replicas and to transmit the selection of the official state to the non-leaders;
- directs each server replica to cooperate with the other server replicas to order operations not ordered as part of the official state; and
- directs the non-leaders to monitor a length of time between when the non-leader sends said information pertaining to the state of the server replicas to the leader and when the selection of the official state is received from the leader, and to elect a new leader when it is determined that the monitored length of time is greater than a threshold value that is dependent upon current network conditions.

* * * * *